(12) United States Patent
Cronin

(10) Patent No.: US 6,257,388 B1
(45) Date of Patent: Jul. 10, 2001

(54) ANTI-SLIP INSERT FOR A BACKSTOPPING CLUTCH

(75) Inventor: Christopher J. Cronin, Orion, MI (US)

(73) Assignee: Warner Electric Technology, Inc., Richmond, VA (US)

( * ) Notice: Subject to any disclaimer, the term of this patent is extended or adjusted under 35 U.S.C. 154(b) by 0 days.

(21) Appl. No.: 09/556,510

(22) Filed: Apr. 24, 2000

(51) Int. Cl.$^7$ .................................................. B60K 41/20
(52) U.S. Cl. ......................................... 192/223; 188/134
(58) Field of Search .................................. 192/223, 215, 192/75, 76, 78; 188/74, 134

(56) References Cited

U.S. PATENT DOCUMENTS

| | | | |
|---|---|---|---|
| 3,335,831 | * 8/1967 | Kalns | 192/223 |
| 3,414,095 | * 12/1968 | Kalns | 192/223 |
| 4,591,029 | * 5/1986 | Da Foe | 188/134 |
| 5,007,511 | * 4/1991 | Ostrander | 192/223 |
| 5,104,461 | 4/1992 | Ostrander . | |
| 5,865,284 | 2/1999 | Creech . | |

OTHER PUBLICATIONS

Formsprag Form–Lock Bi–Directional Driving/Backstopping, cover sheet, pp. 2–5, back sheet.

"Formsprag Form–Lock Bi–Directional Driving/Backstopping Clutches", Bulletin 4601, Jul. 1999, 4 pages.

* cited by examiner

Primary Examiner—Rodney H. Bonck
Assistant Examiner—Saúl Rodriguez
(74) Attorney, Agent, or Firm—Dykema Gossett PLLC

(57) ABSTRACT

A bi-directional back stopping clutch is provided having a hollow outer race, or drum, disposed about a first axis. The outer race includes a radially inner friction surface. The clutch also includes an input member rotatably supported within the outer race and first and second brake shoes disposed within the outer race and in engagement with the input member. Each of the brake shoes includes one or more arcuate surfaces corresponding to the inner surface of the outer race with each arcuate surface defining a slot. The clutch further includes an output pin having a first portion disposed between the first and second brake shoes and a second portion disposed within an opening of an output member. Finally, the inventive clutch includes a hardened insert disposed within each of the slots in the arcuate surfaces of the brakes shoes. The inserts each include a groove formed therein which channels a lubricant within the clutch away from the frictional interface of the insert and the inner surface of the outer race.

18 Claims, 2 Drawing Sheets

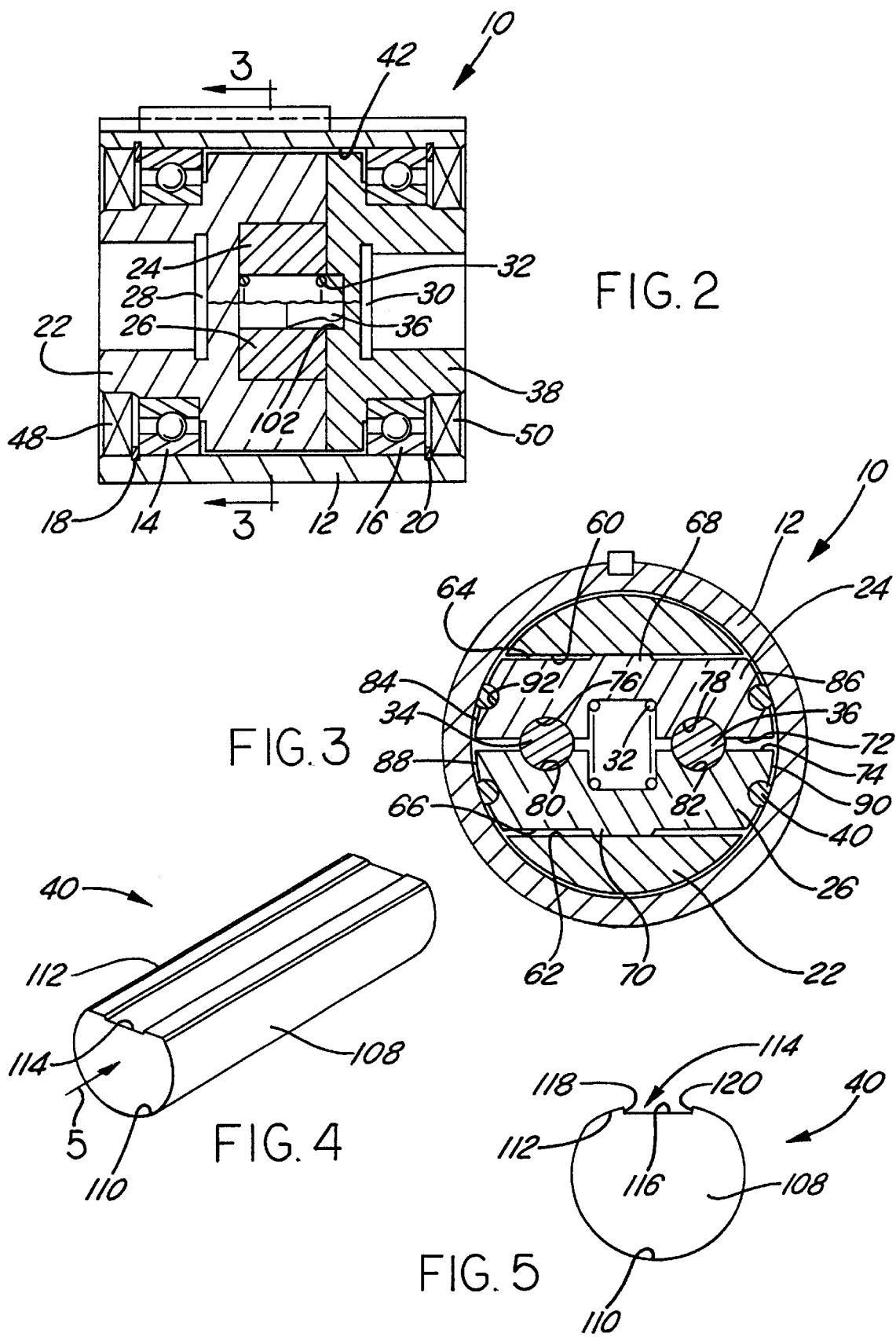

ANTI-SLIP INSERT FOR A BACKSTOPPING CLUTCH

BACKGROUND OF THE INVENTION

1. Field of the Invention

This invention relates to backstopping clutches and, in particular, to an improved frictional insert for use in such clutches.

2. Disclosure of Related Art

Backstopping clutches are used to prevent transfer of a back drive torque from a driven device to a driving, or torque generating, device. The clutch is typically disposed between the output shaft of the driving device and the input shaft of the driven device. The clutch allows torque to be transferred from the output shaft of the driving device to the input shaft of the driven device in order to rotate the input shaft in either rotational direction. The clutch, however, prevents a back driving torque from being transferred from the input shaft of the driven device to the output shaft of the driving device.

A conventional backstopping clutch includes a hollow outer race having a generally cylindrical inner surface. The clutch also includes an input member disposed within the outer race and coupled to the output shaft of the driving device. A pair of opposed brake shoes are coupled to the input member and rotate with the input member as torque is transferred from the driving device to the driven device. The brake shoes have generally arcuate surfaces that correspond to, and are normally spaced from, the inner surface of the race. The clutch further includes an output member that is connected to the input shaft of the driven device and one or more output pins. Each of the output pins has a first portion disposed between the two brake shoes and a second portion disposed within a corresponding opening in the output member. A lubricant is generally used within the clutch to reduce wear on the components of the clutch.

During normal operation, rotation of the output shaft of the driving device causes a corresponding rotation in the input member of the clutch, and consequently, the brake shoes, output pins and output member of the clutch, to thereby transfer torque to the input shaft of the driven device. In the event that the driven device attempts to generate a back drive torque through the clutch, rotation of the output member causes the output pins to become skewed. As a result, the brake shoes are forced apart from one another and into frictional engagement with the inner surface of the outer race of the clutch.

The above-described clutch often include hardened inserts disposed within slots formed in the arcuate surfaces of the brake shoes. The inserts frictionally engage the inner surface of the race when the brake shoes are forced apart as described above and are provided to reduce wear on the brake shoes. After a period of time, however, the hardened inserts in conventional clutches tend to "hydroplane" or slip relative to the inner surface of the race due to the presence of the lubricant within the clutch. As a result, the inserts do not frictionally engage the race of the clutch and the clutch may fail to prevent transfer of a back driving torque.

There is thus a need for an improved back-stopping clutch that will minimize or eliminate one or more of the above-mentioned deficiencies.

SUMMARY OF THE INVENTION

The present invention provides a backstopping clutch having an improved frictional insert.

A backstopping clutch in accordance with the present invention includes a hollow outer race disposed about a first axis. The outer race includes a radially inner friction surface that may be substantially cylindrical in shape. The clutch also includes an input member rotatably supported within the outer race and first and second brake shoes disposed within the outer race and in engagement with the input member. Each of first and second brake shoes includes one or more arcuate surfaces corresponding to the inner surface of the outer race. Further, at least one of the arcuate surfaces defines a slot that may extend in a direction parallel to the first axis. The clutch further includes at least one output pin and an output member having an opening therein. A first portion of the output pin is disposed between the first and second brake shoes and a second portion of the output pin is disposed within the opening in the output member. Finally, the clutch includes an insert disposed within the slot defined by the arcuate surface of the brake shoe. In accordance with the present invention, the insert includes a groove. The groove may extend in a direction parallel to the axis of the clutch and may include first, second, and third, walls with the second and third walls opposing one another and perpendicular to the first wall.

A backstopping clutch in accordance with the present invention represents a significant improvement as compared to conventional backstopping clutches. When a back driving torque is applied to the clutch and the brake shoes and inserts are urged radially outward into engagement with the inner surface of the race of the clutch, the groove in the insert channels the lubricant within the clutch away from the engagement surfaces. As a result, the insert is less likely to "hydroplane" or slip relative to the inner surface of the race and the clutch is better able to prevent a back driving torque from being transferred to the driving device.

These and other features and objects of this invention will become apparent to one skilled in the art from the following detailed description and the accompanying drawings illustrating features of this invention by way of example.

BRIEF DESCRIPTION OF THE DRAWINGS

FIG. 2 is a cross-sectional view of the backstopping clutch of FIG. 1.

FIG. 3 is a sectional view of the backstopping clutch of FIG. 3 taken substantially along lines 3—3.

FIG. 4 is a perspective view of an insert of the backstopping clutch of FIG. 1.

FIGS. 5 is a plan view of the insert of FIG. 4 taken in the direction of line 5.

DETAILED DESCRIPTION OF THE PREFERRED EMBODIMENT

Figure 1:
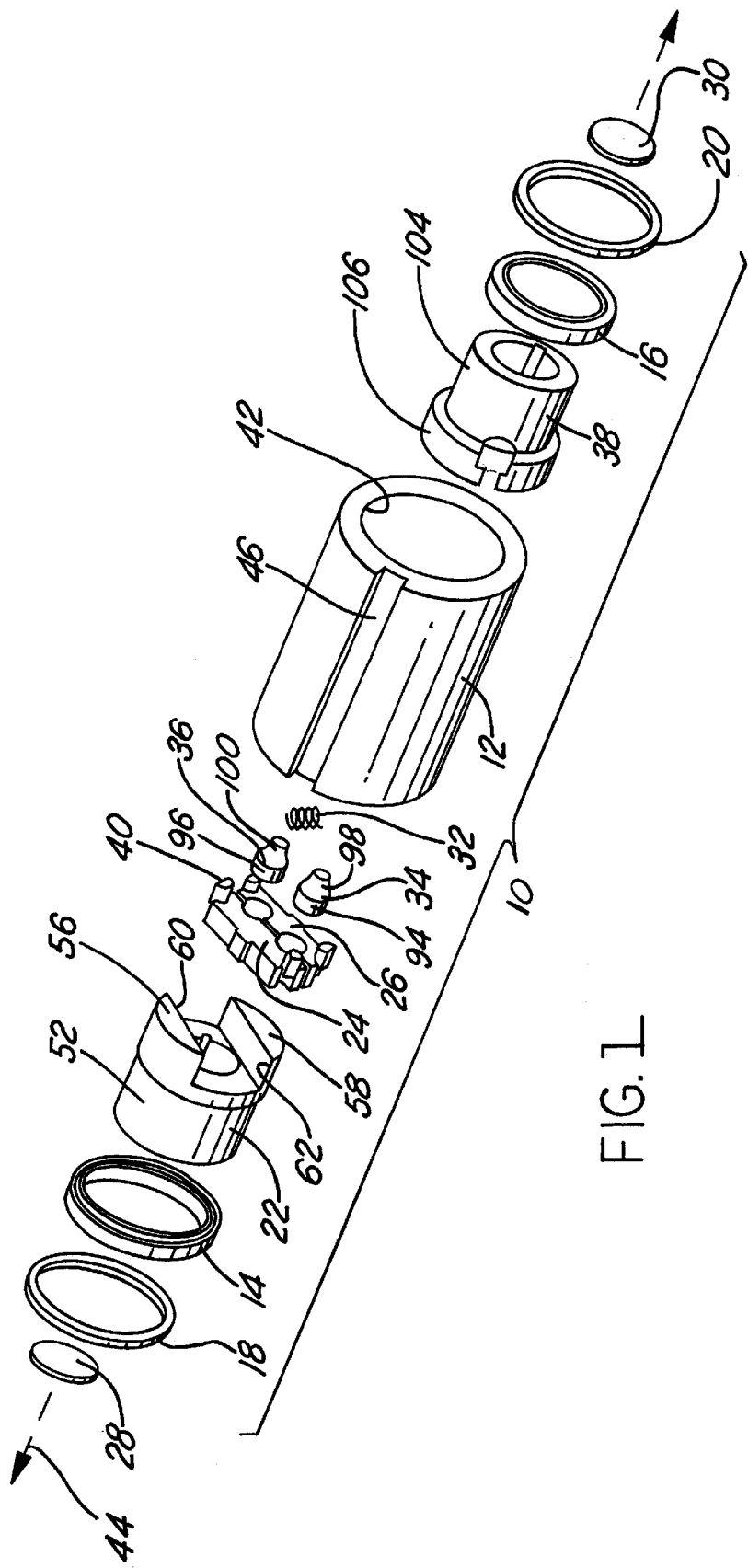
FIG. 1 is an exploded perspective view of a backstopping clutch in accordance with the present invention.

Referring now to the drawings wherein like reference numerals are used to identify identical components in the various views, FIG. 1 illustrates a backstopping clutch 10 in accordance with the present invention. Clutch 10 may be disposed between a driving, or torque generating, device (not shown) and a driven device (not shown) and is provided to prevent transfer of a back driving torque from the driven device to the driving device. Clutch may include an outer race 12 or drum, bearings 14, 16, retaining rings 18, 20, an input member 22, brake shoes 24, 26, plugs 28, 30, one or more springs 32, output pins 34, 36, an output member 38, and a plurality of inserts 40.

Race 12 provides a housing for the other components of clutch 10 as well as a braking surface 42 for selective frictional engagement by brake shoes 24, 26. Race 12 is conventional in the art. Race 12 is substantially cylindrical in shape and may be disposed about an axis 44. A keyway 46 may be formed in a radially outer surface of race 12 to secure race 12 to a support (not shown) and prevent rotation of race 12. The radially inner braking surface 42 of clutch 10 is substantially cylindrical in shape and may include one more grooves designed to improve flow of a lubricant within clutch. The lubricant within clutch 10 may comprise Mobil Temp SHC 32 grease from Exxon Mobil Corporation.

Bearings 14, 16 are provided to allow rotation of input member 22 and output member 38, respectively, relative to race 12.

Bearings 14, 16 are conventional in the art and may comprise roller bearings. Each of bearings 14, 16 includes an outer race disposed against surface 42 of race 12. The inner race of bearings 14 is disposed against input member 22 while the inner race of bearings 16 is disposed against output member 38.

Retaining rings 18, 20 are provided to maintain the position and relationship of the components of clutch 10. Rings 18, 20 are conventional in the art and may be disposed near opposite axial ends of clutch 10. Referring to FIG. 2, conventional seals 48, 50 may be disposed on one side of rings, 18, 20, respectively, opposite bearings 14, 16 to prevent the loss of lubricants from clutch 10.

Input member 22 is provided to receive and transfer a driving torque from an output shaft of a driving, or torque generating, device (not shown). Input member 22 is conventional in the art and may be disposed about axis 44. Member 22 includes a generally annular body 52 having an outer diameter sized to allow the inner race of bearings 14 and retaining ring 18 to be received thereon. The radially inner surface of body 52 may include a keyway configured to receive a key from the output shaft of the driving device in order to couple input member 22 to the output shaft for rotation therewith. Member 22 also includes an end plate 54 disposed at one axial end of body 52 and a pair of projecting members 56, 58 that extend from end plate 54 in an axial direction.

Plate 54 and members 56, 58 may be integral with body 52. Members 56, 58 are semi-circular in cross-section and include opposing planar surfaces 60, 62 that are preferably comprised of a hardened steel.

Brake shoes 24, 26 are provided to frictionally engage surface 42 of race 12 in order to prevent transfer of a back driving torque. Shoes 24, 26 are conventional in the art. Referring to FIG. 3, each shoe 24, 26 includes a first surface 64, 66. Each surface 64, 66 defines an extension 68, 70, respectively, configured to engage a corresponding surface 60, 62 of a corresponding member 56, 58 of input member 22. This engagement enables member 22 to transfer a driving torque to brake shoes 24, 26. In the event of a back driving torque, however, brake shoes 24, 26 rock on extensions 68, 70 (i.e., pivot about an axis extending parallel to axis 44) to engage surface 42 of race 12 as described in greater detail hereinbelow. Each shoe 24, 26 also includes a second surface 72, 74, respectively, opposite the first surface 64, 66. Surface 72 of shoe 24 opposes surface 74 of shoe 26. Each surface 72, 74 defines a pair of axially extending, semicircular slots 76, 78 and 80, 82, respectively. Together, slots 76, 80 and 78, 82 define generally circular openings configured to receive a portion of a corresponding output pin 34, 36. Finally, each shoe 24, 26 includes a pair of arcuate surfaces 84, 86, and 88, 90, respectively, extending between the respective first surfaces 64, 66 and second surfaces 72, 74 of brake shoes 24, 26. The shape of arcuate surfaces 84, 86, 88, 90 corresponds to the shape of inner surface 42 of race 12 and arcuate surfaces 84, 86, 88, 90 are normally spaced from surface 42 when torque is being transferred from the driving device to the driven device. Each arcuate surface 84, 86, 88, 90 defines one or more axially-extending slots 92 configured to receive inserts 40. Slots 92 may be semicircular in cross-section.

Referring now to FIG. 2, plugs 28, 30 are provided to maintain the axial position of brake shoes 24, 26 and spring 32 within clutch 10. Plugs 28, 30 are conventional in the art. Plug 28 may be disposed within the opening defined by body 52 of input member 22 while plug 30 may be disposed within an opening defined by output member 38.

Spring 32 is provided to bias brake shoes 24, 26 apart and to urge extensions 68, 70 of shoes 24, 26 into engagement with projecting members 56, 58 of input member 22 thereby rotatably coupling shoes 24, 26 to member 22. Spring 32 is conventional in the art. Referring to FIG. 3, a first end of spring 32 may be disposed within a recess (now shown) formed in surface 72 of shoe 24 while a second end of spring 32 may be disposed within a corresponding recess (not shown) formed in surface 74 of shoe 26. Although only one spring 32 is shown in the illustrated embodiment, it should be understood that additional springs 32 may be used. Further, it should be understood that other means, such as spacers, may be used in place of, or in addition to, springs 32 to position brake shoes 24, 26 relative to one another and members 56, 58 of input member 22.

Referring again to FIG. 1, output pins 34, 36 are provided to transfer a driving torque to output member 38 and to prevent transfer of a back driving torque to input member 22. Pins 34, 36 are conventional in the art and are aligned in a parallel fashion. Each pin 34, 36 may include a shank portion 94, 96, and a head portion 98, 100, respectively. Each end of each shank portion 94, 96 may include a raised ridge (not shown) so as to maintain shank portions 94, 96 within the corresponding openings defined by slots 76, 80 and 78, 82 in surfaces 72, 74 of brake shoes 24, 26. Head portions 98, 100 are received within openings 102 (best shown in FIG. 2) of output member 38. When a driving torque is generated by the driving device, output pins 34, 36 transfer torque from input member 22 and brake shoes 24, 26 to output member 38. When a back driving torque is generated by the driven device, however, output member 38 will rotate relative to brake shoes 24, 26, causing the head portion 98, 100 of each pin 34, 36 to become displaced and causing pins 98, 100 to tilt or become skewed within the openings defined by slots 76, 80 and 78, 82—and relative to axis 44—thereby urging brake shoes 24, 26 into frictional engagement with surface 42 of race 12. In particular, pins 34, 36 are aligned on opposite sides of axis 44 and at substantially equal distances from axis 44. Referring to FIG. 3, pins 34, 36 are also further from a plane extending through axis 44 than extensions 68, 70 of brake shoes 24, 26. As a result, if sufficient force is exerted on either pin 34, 36 in a direction perpendicular to surface 72 of shoe 24, pins 34, 36 tilt, increasing the load by brake shoe 24 on surface 42 of race 12. Similarly, if sufficient force is exerted on either pin 34, 36, in a direction perpendicular to surface 74 of shoe 26, pins 34, 36 tilt, increasing the load by brake shoe 26 on surface 42 of race 12.

Output member 38 is provided to transfer torque to the input shaft of a driven device. Member 38 is conventional in the art and may include a generally cylindrical body 104 disposed about axis 44 and an end plate 106. Body 104 may include a keyway on a radially inner surface that is configured to receive a key on an input shaft of the driven device. Referring to FIG. 2, the radially outer surface of body 104 is sized to allow the inner race of bearings 16 and retaining ring 20 to be received thereon. Plate 106 includes a pair of openings 102 (best shown in FIG. 2). Openings 102 are aligned with the openings defined by slots 76, 80, and 78, 82 in brake shoes 24, 26 and are configured to receive head portions 98, 100 of output pins 34, 36.

Inserts 40 are provided to frictionally engage surface 42 of race 12 in the event a back driving torque is applied to clutch and reduce wear on brake shoes 24, 26. Inserts 40 may be made from tungsten carbide. Alternatively, inserts 40 may be made in the manner set forth in U.S. Pat. No. 5,104,461, the entire disclosure of which is incorporated herein by reference, and may comprise an alloy tool steel, such as M50 steel, having a titanium nitrate finish. Inserts 40 extend in a direction parallel to axis 44 and are disposed within slots 92 formed in arcuate surfaces 84, 86, and 88, 90 of brake shoes 24, 26. In one constructed embodiment, each insert 40 had a diameter of about 0.25 inches and an axial length of about 0.89 inches.

Referring now to FIGS. 4 and 5, insert 40 has a generally semi-circular body 108 having a first rounded surface 110 and a second slightly curved surface 112. When a back drive torque is applied to clutch 10, inserts 40 rotate within slots 92 in surfaces 84, 86 and 88, 90 of brake shoes 24, 26 so that surface 112 of each insert 40 engages surface 42 of race 12. As is known in the art, this movement insures uniform loading of the engaging surfaces and reduces wear on the components of clutch 10, such as brake shoes 24, 26. Further, inserts 40 are easily replaceable as compared to brake shoes 24, 26.

In accordance with the present invention, each insert 40 includes a groove 114 formed in surface 112 of body 108. Groove 114 extends longitudinally from one end of body 108 to a second end of body 108 and, when insert 40 is disposed within slot 92, groove 114 extends in a direction parallel to axis 44. For manufacturability, groove 114 preferably includes first, second, and third walls 116, 118, 120, with walls 118, 120 opposing one another and perpendicular to wall 116. It should be understood, however, that groove 114 could be formed in a variety of ways without departing from the spirit of the present invention—including, for example, as a concave groove. Groove 114 may be formed by grinding surface 112 of insert 40. In one constructed embodiment, groove had a width of about 0.1 inches and a depth of about 0.005 inches.

The incorporation of a grooved insert 40 within clutch 10 represents a significant improvement as compared to conventional backstopping clutches. After a period of time, the inserts in conventional clutches wear down and tend to "hydroplane" or slip relative to the inner braking surface of the race due to the presence of a lubricant within the clutch. Insert 40 channels the lubricant away from the interface of surface 112 of insert 40 and surface 42 of race 12, thereby improving the frictional engagement of insert 40 and race 12. As a result, the life and performance of clutch 10 are greatly improved as compared to conventional backstopping clutches.

While the invention has been particularly shown and described with reference to the preferred embodiments thereof, it is well understood by those skilled in the art that various changes and modifications can be made in the invention without departing from the spirit and scope of the invention.

What is claimed is:

1. A bi-directional back stopping clutch, comprising:
   a hollow outer race disposed about a first axis, said outer race having a radially inner surface;
   an input member rotatably supported within said outer race;
   first and second brake shoes disposed within said outer race and in engagement with said input member, said first brake shoe having a first arcuate surface corresponding to said inner surface of said outer race, said first arcuate surface of said first brake shoe defining a first slot;
   an output pin having a first portion disposed between said first and second brake shoes and a second portion;
   an output member having an opening configured to receive said second portion of said output pin; and,
   a first insert disposed within said first slot
   wherein said first insert includes a groove.

2. The clutch of claim 1 wherein said second brake shoe has a first arcuate surface corresponding to said inner surface of said outer race, said first arcuate surface of said second brake shoe defining a second slot, said clutch further comprising a second insert disposed within said second slot, said second insert including a groove.

3. The clutch of claim 1 wherein said first brake shoe has a second arcuate surface corresponding to said inner surface of said outer race, said second arcuate surface of said first brake shoe defining a second slot, said clutch further comprising a second insert disposed within said second slot, said second insert including a groove.

4. The clutch of claim 1 wherein said first slot is semi-circular in cross-section.

5. The clutch of claim 1 wherein said first insert is made from tungsten carbide.

6. The clutch of claim 1 wherein said first insert is made from steel with a titanium nitrate finish.

7. A bi-directional back stopping clutch, comprising:
   a hollow outer race disposed about a first axis, said outer race having a radially inner surface;
   an input member rotatably supported within said outer race;
   first and second brake shoes disposed within said outer race and in engagement with said input member, said first brake shoe having a first arcuate surface corresponding to said inner surface of said outer race, said first arcuate surface of said first brake shoe defining a first slot;
   an output pin having a first portion disposed between said first and second brake shoes and a second portion;
   an output member having an opening configured to receive said second portion of said output pin; and,
   a first insert disposed within said first slot
   wherein said first insert includes a groove having first, second, and third walls, said second and third walls opposing each other and perpendicular to said first wall.

8. The clutch of claim 7 wherein said second brake shoe has a first arcuate surface corresponding to said inner surface of said outer race, said first arcuate surface of said second brake shoe defining a second slot, said clutch further comprising a second insert disposed within said second slot, said second insert including a groove.

9. The clutch of claim 7 wherein said first brake shoe has a second arcuate surface corresponding to said inner surface of said outer race, said second arcuate surface of said first brake shoe defining a second slot, said clutch further comprising a second insert disposed within said second slot, said second insert including a groove.

10. The clutch of claim 7 wherein said first slot is semi-circular in cross-section.

11. The clutch of claim 7 wherein said first insert is made from tungsten carbide.

12. The clutch of claim 7 wherein said first insert is made from steel with a titanium nitrate finish.

13. A bi-directional back stopping clutch, comprising:
- a hollow outer race disposed about a first axis, said outer race having a radially inner surface;
- an input member rotatably supported within said outer race;
- first and second brake shoes disposed within said outer race and in engagement with said input member, said first brake shoe having a first arcuate surface corresponding to said inner surface of said outer race, said first arcuate surface of said first brake shoe defining a first slot;
- an output pin having a first portion disposed between said first and second brake shoes and a second portion;
- an output member having an opening configured to receive said second portion of said output pin; and,
- a first insert disposed within said first slot
- wherein said first insert includes a groove extending in a direction parallel to said first axis.

14. The clutch of claim 13 wherein said second brake shoe has a first arcuate surface corresponding to said inner surface of said outer race, said first arcuate surface of said second brake shoe defining a second slot, said clutch further comprising a second insert disposed within said second slot, said second insert including a groove.

15. The clutch of claim 13 wherein said first brake shoe has a second arcuate surface corresponding to said inner surface of said outer race, said second arcuate surface of said first brake shoe defining a second slot, said clutch further comprising a second insert disposed within said second slot, said second insert including a groove.

16. The clutch of claim 13 wherein said first slot is semi-circular in cross-section.

17. The clutch of claim 13 wherein said first insert is made from tungsten carbide.

18. The clutch of claim 13 wherein said first insert is made from steel with a titanium nitrate finish.

* * * * *